July 18, 1961 A. GÖTZBERGER 2,992,947

METHOD AND DEVICE FOR MAKING AN ELECTRODE EXHIBITING RECTIFIER ACTION BY ALLOYING ALUMINUM THERETO

Filed Sept. 10, 1958 2 Sheets-Sheet 1

Inventor.
Adolf Götzberger
By. [signature]
Atty.

Inventor:
Adolf Götzberger.
By [signature] Atty.

United States Patent Office 2,992,947

Patented July 18, 1961

2,992,947

METHOD AND DEVICE FOR MAKING AN ELECTRODE EXHIBITING RECTIFIER ACTION BY ALLOYING ALUMINUM THERETO

Adolf Götzberger, Munich, Germany, assignor to Siemens und Halske Aktiengesellschaft, Berlin and Munich, a corporation of Germany Filed Sept. 10, 1958, Ser. No. 760,248
Claims priority, application Germany Sept. 19, 1957
11 Claims. (Cl. 148—1.5)

This invention is concerned with a method and device for making an electrode exhibiting rectifying action by alloying aluminum thereto.

In transistors having electrodes alloyed thereto, amplification decreases at higher emitter currents. This decrease depends upon the doping ratio of the emitter and base and decreases with increasing doping of the emitter. According to prior art knowledge, the highest possible doping is obtained by the use of an alloying substance containing aluminum. However, such substance, when alloyed to the corresponding parts in customary manner, for example, in the form of a metal pill, produce very irregular contact surfaces. The reason therefor resides in the peculiarity of the aluminum of forming even in molten condition a very stable oxide skin which inhibits wetting with the auxiliary metal and which, as compared with the oxide skin formed in the case of indium, cannot be removed even upon using a reducing atmosphere, for example, hydrogen. There is, of course, the possibility of freeing the aluminum pills of the oxide skin by etching prior to applying them requiring, however, that they must not subsequently come in contact with air. It is in such circumstances very difficult to control the etching operation, so as to obtain the exact amount required for the alloying.

Similar difficulties have originally been encountered in the production of semiconductor devices comprising electrodes made of indium and alloyed into a semiconductor crystal. In order to overcome these difficulties, a very thin coating of an auxiliary metal was provided upon the semiconductor, for example, by galvanic plating, such auxiliary metal providing a covering for the corresponding alloying surface. An indium pill was thereupon placed on the plated metal and was alloyed to the semiconductor crystal by applying heat treatment. It was in this manner possible to obtain upon melting distribution of the alloying metal with adequate wetting only over the surface covered by the auxiliary metal, resulting in great uniformity of the alloyed surface. However, this method fails in connection with aluminum or aluminum-containing alloys of substances due to the high stability of the previously mentioned oxide skin. It was subsequently found that indium could be uniformly alloyed to a semiconductor without the use of an auxiliary metal, by carrying out the operation in a hydrogen atmosphere.

The method according to the invention, for producing electrodes exhibiting rectifying effects by alloying aluminum to a semiconductor crystal, for example, a germanium crystal, avoids the above noted wetting difficulties and the drawbacks connected therewith, by initially alloying to the surface of the germanium crystal a slightly wetting metal and thereupon alloying at a higher temperature aluminum to such metal and the germanium. Among the slightly wetting metals are indium, lead and tin.

Figure 1:
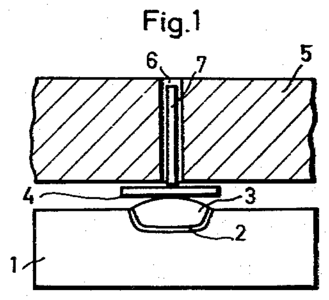
Figure 1A:
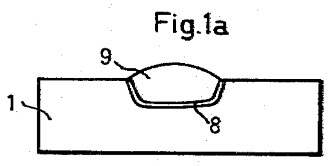
Figure 2:
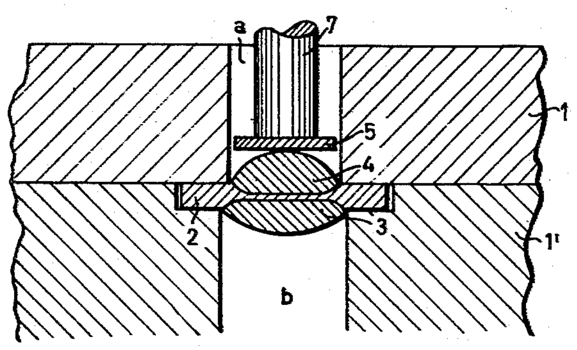
Figure 3:
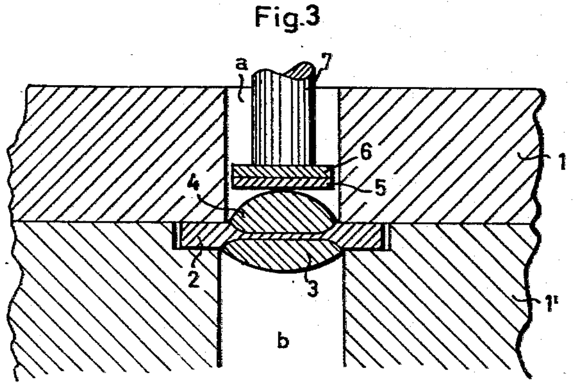

The various objects and features of the invention will appear from the description which will be rendered below with reference to the accompanying drawings, wherein FIG. 1 is intended to aid in explaining the steps of the new method;

FIG. 1*a* shows a semiconductor comprising an electrode provided thereon by the new method; and FIGS. 2 and 3 are intended to aid in explaining further features of the invention.

Referring to FIG. 1, numeral 1 indicates a wafer made of germanium monocrystal. Upon this wafer is placed a pill of indium. The wafer 1 and the pill of indium are heated in a hydrogen atmosphere in a graphite die to about 450° C. In the indium pill which is thus made liquid, there will dissolve some germanium; the amount of dissolved germanium being definitely determined by the amount of indium and by the temperature applied. The structure is thereupon cooled down causing the germanium dissolved in the indium to crystallize again substantially upon the non-affected part of the germanium wafer 1, the germanium being however somewhat streaked with indium. The resulting layer of alloy consisting of indium and germanium is indicated at 2. The indium pill 3 which is relatively free of germanium solidifies above the layer or coating 2.

A small aluminum plate 4 is now placed upon the solidified indium pill 3. Aluminum with a purity of 99.8 percent will suffice. The crystal and the aluminum part 4 are thereupon covered by a graphite die 5 provided with a bore or channel 6 formed therein, such bore being directed to the aluminum part 4. A small rod 7 made of carbon or other material which is for the intended use chemically indifferent, for example, chromium, is introduced into the bore 6.

The die is now heated to about 500° C., resulting in the formation of a liquid alloy of aluminum, indium or germanium which bites deeper into the crystal than, as before, the indium alone. In order to facilitate the alloying of the aluminum, the die may be vibrated or agitated, the rod 7 being thereby in a sense operative to rub the aluminum plate into the indium.

The structure is thereupon cooled down, preferably relatively quickly, for example, within one minute from about 500° C. to about 300° C. As shown in FIG. 1*a*, the solidified alloy then consists substantially of two phases, one phase 8 bordering on the germanium crystal 1 and consisting of aluminum, germanium and indium, and a phase 9 consisting nearly exclusively of aluminum and indium. The layer 8 is determinative for the rectifying effect. The amount of aluminum in the layer 8 is substantially determined by the ratio of aluminum to the indium. The amount of aluminum is preferably about 0.5 to 5 percent of weight of the indium or, in other embodiments, of the tin or the lead.

The following results were obtained in connection with an example of the invention:

The germanium wafer had a specific resistance of 3 ohm/cm. The emitter in accordance with the invention alloyed to the wafer at a diameter of 2.6 millimeters. The ratio of collector current to the base current was within the range from about 200 to about 5000 ma. collector current constant within 5 percent. In comparable devices made in accordance with previously known methods, the amplification dropped by 60 percent and more. In this example, the weight part of the aluminum amounted to 1 percent.

Further objects and features of the invention are concerned with improvements on the above described method for producing semiconductor devices comprising, for example, a monocrystalline semiconductor body having alloyed thereto at least one electrode consisting in part of aluminum which may be as described preferably connected as emitter electrode. The surface of the semiconductor body which is to receive the electrode to be alloyed thereto is prepared for the alloying, preferably by etching, reduction or the like, whereupon an alloying pill consisting of an auxiliary metal which is substantially free of aluminum is alloyed thereto with adequate wetting at a first alloying temperature T1, a preferably disk shaped alloying body consisting of aluminum or an aluminum alloy being thereafter fused to the alloyed auxiliary metal at a second fusing temperature T2, such body being upon reduction of the temperature to a value T3 alloyed to the structure, and the resulting liquid metal mixture being after alloying of the auxiliary metal with the aluminum-containing alloying body further alloyed into the semiconductor body at a further alloying temperature T4.

The semiconductor body should be well wetted by the auxiliary metal and the latter must be at elevated temperature alloyable with the material of the aluminum-containing alloying body. It is moreover advantageous that the auxiliary metal either supports the doping action of the aluminum or that it does not disturb the doping action thereof. The auxiliary metal shall preferably have a lower melting point than the aluminum or the aluminum alloy that may be used, which is the case with the metals indium, lead or tin.

It is not necessary, as recommended in connection with the state of the prior art, to plate the desired alloying surface or area with a further auxiliary metal to provide for the adequate wetting of the indium with the surface of the semiconductor so as to obtain a defined alloy area. Instead, as previously described, guide bodies, for example, graphite dies are employed which are placed upon the semiconductor body in defined manner and provided with guide channels formed therein, such guide channels directing the alloying substance and the auxiliary metal, for example, by gravity, to the area on the semiconductor surface which is intended for the alloying. The use of such guide means makes it possible to obtain with corresponding dosing of the auxiliary metal an adequate and entirely sufficient wetting, especially when the alloying of the auxiliary metal as well as the remaining steps of the new methods are carried out in a hydrogen atmosphere.

The auxiliary metal shall only be alloyed on or to the semiconductor body but not alloyed thereinto. In other words, and compared with the final alloying step, only little of the auxiliary metal shall permeate into the semiconductor and shall form an alloying face as even as possible. The temperature T1 which is applied in connection with the first method step is for this reason only high enough to effect melting of the auxiliary metal with only negligible penetration thereof into the semiconductor. The temperature is thereupon reduced, going advantageously under the solidification temperature of the auxiliary metal, so that the alloying is reliably interrupted at a point where the auxiliary metal is alloyed to the semiconductor without having appreciably penetrated thereinto. Upon using indium as auxiliary metal and germanium as a semiconductor, the temperature T1 will preferably be about 450° C., at least 400° C. and, in the case of alloying a pill with a diameter of about 1.5 millimeters, will be applied for about 1 minute. Customary methods for alloying indium to germanium employ temperatures ranging from 500° C. to 600° C.

Upon the preferably solidified auxiliary metal is placed the alloying body proper, made of aluminum and, for example, in the form of a small disk with a diameter, as shown in FIG. 2, leaving some play with respect to the guide channel of the guide body. As previously stated, this disk should be of a degree of purity of 99.8 percent. It was found, however, that it is frequently suitable to use an aluminum alloy in place of the alloying body consisting exclusively of aluminum. As will be presently explained more in detail, it was particularly found that an alloy made of aluminum and the material of the semiconductor, for example, germanium, proved favorable, whereby care must of course be taken that these materials are of proper purity.

Upon the aluminum alloying body is placed a load member, for example, a small rod made of carbon or chromium steel or another indifferent material which cannot be wetted by the molten alloying and auxiliary metal and which does not cause contamination, and such member and/or the resulting assembly is agitated or vibrated causing said load member by its weight and inertia and guided in the guide channel, as it were, to rub the alloying body into the molten auxiliary metal. It will be advisable to effect this agitation while the auxiliary metal alloyed to the semiconductor is still in a solid state, because the oxide skin of the alloying body will in this manner be more effectively rubbed off. The temperature is increased during the agitation to the fusing temperature T2 and thereupon decreased to the value T3; the load member may thereupon be removed and the temperature T4 may be applied as described.

The alloying of the aluminum-containing alloying body to the auxiliary metal is in accordance with the invention effected in two steps, comprising application of a somewhat increased temperature T2 at which the aluminum of the alloying body is fused or melted to the auxiliary metal, whereupon the temperature is decreased to a somewhat lower value T3 at which is effected the alloying of the auxiliary metal with the aluminum, that is, the intermixing or interalloying of the two metals.

It has been found that the temperature T3, which is required for the alloying of the aluminum-containing body to the auxiliary metal, is lower than the temperature T2 required for initiating this operation, that is to say, for effecting contact between the two metals, namely, fusing or melting the aluminum to the auxiliary metal.

While the fusing is more readily effected with higher temperature T2, it must always be considered that higher temperature will operate to shift the alloying front of the auxiliary metal deeper into the semi-conductor, which is to be avoided during this phase of the new method. Above all, the temperature T2 (also T3) must not go above the melting point of the aluminum because the danger would otherwise arise that greater amounts of aluminum would enter into the auxiliary metal which, as compared with the amount of auxilary metal, would cause increased dissolution of the semiconductor material, especially of germanium, thus effecting a strong and uncontrollable penetration of the alloying front into the semiconductor crystal. In accordance with the invention, such further penetration or advance of the alloying front into the semiconductor is to be avoided during this phase of the method. The object is to produce initally a defined homogeneous intermixing or interalloying of the alloying metal with the auxiliary metal, according to a known doting strength, such intermixed alloy entering only slightly into the semiconductor, and to effect the entering of the alloying substance, that is, the alloying proper, only after this object has been achieved. If the alloying of the semiconductor would be effected to a considerable extent, the consequence would be an uncontrollable course of the alloying operation and of the alloying front; this would render reliable reproduction of the operation at least very difficult.

Both temperatures T2 and T3 are determined by the properties of the auxiliary metal and those of the material of the alloying body. It has been found that, when the alloying body of indium is once melted to or fused to the semiconductor, a temperature T3 of about 400° C. will suffice for the complete alloying of the aluminum or aluminum-containing alloy into the auxiliary metal, provided that the amount of the aluminum alloy which is to be alloyed is about 0.5 to 5 percent by weight of the auxiliary metal. The time required is shortened by the previously described agitation and amounts to about 5-10 minutes; the agitation being also operative to effect good interalloying of the auxiliary metal with the metal of the alloying body. At the proposed low temperature T3, there is effected only a slight further advance of the alloying front into the semiconductor body.

The melting or fusing of the alloying body to the auxiliary metal requires a higher temperature and is effected in the case of indium as auxiliary metal and germanium as a semiconductor at the temperature T2= about 470° C. Such temperature is, however, high enough to introduce the danger of noticeable further advance of the alloying front into the semiconductor, if the auxiliary metal has absorbed a considerable amount of aluminum. The temperature T2 therefore must be applied only briefly, for about 1 to 2 minutes.

The steps of the method according to the invention which have so far been described, effect placement, upon a precisely determined area on the surface of the semiconductor which is intended for the alloying, of a liquid metal pill consisting of the auxiliary metal well intermixed or interalloyed with the material of the aluminum-containing alloying body, and advance thereof into the semiconductor to only a fraction of the final alloying depth. The alloying proper, at which this fluid or liquid metal pill is driven to the intended alloying depth, is now effected. During the concluding or terminal phase of the method according to the invention, there is to be effected a complete resolution of the re-crystallization zone formed by the alloying or fusing of the auxiliary metal to the semiconductor. Moreover, the alloying front is to be advanced into the semiconductor to the intended depth, and upon solidification of the alloying metal, there is to be formed a new re-crystallization zone consisting of the semiconductor material doped with aluminum. The temperature T4 which is to be applied and the duration of this final phase of the method according to the invention are essentially determined by these aspects.

It is for the depth advance of the alloying front into the semiconductor in many cases unnecessary to increase the temperature beyond the temperature T1 at which is effected the alloying of the auxiliary metal to the semiconductor. For example, if the alloying of the aluminum into germanium is carried out with indium as an auxiliary metal, the aluminum containing indium will effect stronger dssolution of the germanium than in unmixed condition thereof. It will in such case suffice to increase the temperature T4 beyond the value T3 so that T4 lies upon alloying of the alloying metal above the eutectic temperature of the system aluminum-germanium, which is about 424° C. Upon using other semiconductors or auxiliary metals, care must likewise be taken to provide for an alloying temperature T4 which is above the eutectic temperature of the corresponding semiconductor and alloying metal because it would otherwise be impossible to form a re-crystallization zone which has to fulfill the requirements of an emitter or collector, respectively.

The temperature T4 as well as the time required for alloying otherwise depend upon the intended depth of the alloying front in the semiconductor, and the corresponding most favorable values must be experimentally established for given cases. The fine setting of the depth of advance of the alloying metal into the semiconductor may be obtained by slight variation of the treatment temperature T4 or by variation of the duration of this last phase of the new method. A temperature of about 450° C. was found particularly favorable in connection with the alloying of indium and aluminum and indium, aluminum and germanium, to germanium. The time for alloying the alloying metal into germanium lies at about 5 minutes.

As has already been mentioned, it may be advantageous to use under some circumstances a germanium-aluminum alloy as an alloy body. This is based upon finding in the course of investigations underlying the invention, that an equally large amount of aluminum penetrates into the semiconductor at identical temperature less strongly when such aluminum is intermixed with the corresponding semiconductor material. This finding is particularly important in vew of the phase of fusing to and alloying into the semiconductor, particularly germanium, the aluminum-containing alloying body. As already emphasized, the advance of the alloying front into the semiconductor is to be avoided during these two steps as much as possible. The solving power of the liquid metal pill with respect to the semiconductor is considerably increased by the penetration of or advance of the aluminum into the auxiliary metal and it is, accordingly, as already mentioned, of great importance to apply low treatment temperatures T2 and T3 and to make the treatment with the higher temperature T2 as short as possible. In accordance with the invention, the corresponding semiconductor material may be added to the liquid alloying metal so as to secure a sufficiently stationary behavior of the alloying front during the phases of fusing the auxiliary metal to the semiconductor and alloying the aluminum-containing alloying metal to the auxiliary metal, respectively. The presence of germanium (or another semiconductor that may be employed) in the alloying metal effects, as it were, saturation of the solving power of aluminum with respect to the semiconductor, thus strongly reducing the danger of advancing the alloying front particularly during the second and third phase of the new method.

The introduction of the corresponding semiconductor material into the alloying metal may be effected (*a*) by simultaneously alloying into the auxiliary metal two alloying bodies, for example, in the form of two superposed small disks, one disk made of aluminum and the other of semiconductor material, whereby several such alloying bodies may be used, alternately consisting of semiconductor material and aluminum; (*b*) the alloying body may consist of a mixture of aluminum and the material of the semiconductor being employed; and (*c*) the auxiliary metal may contain semiconductor material, that is, it may consist of an alloy of a suitable metal and semiconductor material.

The course of the individual phases of the method according to the invention is by the use of the above described feature materially changed. The temperatures T2 and T3 specified for the alloying of aluminum and indium into germanium can moreover be applied without changes when adding to the alloying metal germanium. The temperature T1 will however be higher in case "(*c*)" than it would be upon using pure indium as an auxiliary metal. For the temperature T4 there will apply the previously mentioned aspects without any changes. The optimum parts of semiconductor material in the aluminum and of the auxiliary metal must be experimentally determined in forming the alloying metal. A weight ratio of 2.9 (Ge) to 2.4 (Al) to 4.0 (In) has been found particularly useful in the case of the system germanium-aluminum-indium.

As has been mentioned previously, the addition to the alloying metal of the material of the semiconductor employed effects a certain saturation of the aluminum. This is of particular importance in view of the fact that uniform intermixing of the alloying metals is not effected instantaneously, the lighter aluminum initially tending to remain on the surface of the alloying metal and then sinking downwardly, thus producing the danger of deeper penetration at indeterminable points along marginal portions of the alloying pill and therewith irregular formation of the pn-transition to be effected. This phenomenon can be reliably prevented by applying the above suggested procedure.

The method according to the invention will now be explained with reference to FIGS. 2 and 3, corresponding parts appearing in these figures being identically referenced.

The germanium crystal 2 is held between two guide members 1 and 1' having guide channels *a* and *b* formed therein which extend to the areas of the semiconductor surface which are provided for placing the alloying. The collector pill 3 is assumed to be alloyed in its proper position. The functioning of the collector does not require aluminum-containing material for the pill 3. For this reason, pure indium will in many cases be employed and in customary manner alloyed in place to serve as collector. It is however desirable to provide an emitter pill containing aluminum for its strongly doting properties.

FIGS. 2 and 3 show the semiconductor device to be produced in accordance with the invention, prior to the provision of the aluminum-containing alloying body on the indium pill 4 which serves as auxiliary metal and which is assumed to be already alloyed to the semiconductor 2.

In FIG. 2, the aluminum-containing alloying body 5 which is in the form of a small plate or disk, is placed upon the indium pill 4 and is by means of the rodlike member 7 in accordance with the invention rubbed into the indium which is coincidently liquified by applying an elevated temperature.

In FIG. 3, there are provided two alloying bodies 5 and 6 made respectively of aluminum and germanium. The sequence in which these bodies are placed is immaterial. The parts by weight of the two alloying bodies are 2.2 (Al) to 2.9 (Ge). As noted before, more such alloying bodies may be provided.

Changes may be made within the scope and spirit of the appended claims which define what is believed to be new and desired to have protected by Letters Patent.

I claim:

1. A method of producing semiconductor devices having a semiconductor body and at least one aluminum-containing electrode alloyed thereto, comprising taking a semiconductor body and alloying thereto at the area thereof where said electrode is to appear an auxiliary metal adapted to wet said semiconductor body, thereafter alloying an aluminum-containing body to said auxiliary metal, thereupon alloying into said semiconductor body both said auxiliary metal and the aluminum-containing body alloyed thereto, and agitating the materials to be alloyed to said semiconductor body during the alloying thereof.

2. A method of producing semiconductor devices having a semi conductor body and at least one aluminum-containing electrode alloyed thereto, comprising taking a semiconductor body and alloying thereto at the area thereof where said electrode is to appear, an auxiliary metal adapted to wet said semiconductor body, said auxiliary metal being alloyed at a temperature which is only a fraction of the temperature required for the final alloying depth and penetration of the auxiliary metal by the formation of a practically plane alloying front, thereafter alloying an aluminum-containing body to said auxiliary metal by heating to a temperature just sufficient to effect an alloying of such aluminum-containing body to the auxiliary metal, thereupon lowering the temperature to obtain fusion at which the material of the alloying body is still completely alloyed in the auxiliary metal while a further penetration of the alloying front into the semiconductor body is prevented, and thereafter raising the temperature to effect a complete resolving of the recrystallization zone formed by the auxiliary metal and a penetration of the alloying front to the finally desired penetration depth into the semiconductor crystal.

3. A method according to claim 2, wherein said auxiliary metal consists of a mixture of the material of said semiconductor body and aluminum and particularly of a eutectic alloy of said materials.

4. A method according to claim 2, comprising simultaneously alloying into said auxiliary metal aluminum and material corresponding to the material of the semiconductor body.

5. A method according to claim 2, comprising intermixing with said auxiliary metal prior to the alloying thereto said aluminum-containing body, a material corresponding to the material of said semiconductor body.

6. A method according to claim 2, comprising placing upon the semiconductor body to be processed a guide which is made of a material remaining unaffected by the alloying metals in a wetting sense and having a channel formed therein the cross sectional dimensions of which determine the extent of the alloying area on said semiconductor, introducing into said guide channel a pill of said auxiliary metal which drops therethrough to said area on said semiconductor body, applying heat to melt said pill so as to alloy the material thereof to said semiconductor body, thereupon introducing into said guide channel an aluminum-containing material which drops therethrough into contact with said auxiliary metal alloyed to said semiconductor body, interalloying said aluminum containing material to said auxiliary metal on said semiconductor body, thereafter alloying both said auxiliary metal interalloyed with said aluminum-containing material into said semiconductor body to a desired depth, and removing said guide upon conclusion of said alloying.

7. A method of producing semiconductor devices having a semiconductor body and at least one aluminum-containing electrode alloyed thereto, comprising taking a semiconductor body and preparing the area thereof where said electrode is to appear, placing an auxiliary metal adapted to wet said semiconductor body upon said prepared area in the form of a pill made of a metal which is free of aluminum, alloying said material to the semiconductor body by applying a predetermined first temperature, fusing to the material of said auxiliary metal thus alloyed to said semiconductor body at a second temperature applied thereto another body containing aluminum, reducing said second temperature to a third temperature to effect interalloying of the material of said body with the material of said auxiliary metal without material penetration thereof into the semiconductor body, and thereupon applying a fourth temperature to alloy the interalloyed materials to a desired depth into said semiconductor body.

8. A method according to claim 7, comprising causing said auxiliary metal alloyed to said semiconductor body to solidify after the corresponding alloying thereof, thereupon placing upon such auxiliary metal an aluminum-containing body and upon such body a load member made of indifferent material which is not wetted by the molten alloying materials, agitating said load member to agitate the materials to be alloyed correspondingly, increasing the temperature during such agitation, thereafter decreasing said temperature, and thereafter removing said agitating member and applying said fourth temperature.

9. A method according to claim 7, wherein said second and third temperatures are below the melting point of the alloying material alloyed to said auxiliary metal.

10. A method according to claim 7, comprising maintaining said third temperature applied for the interalloying of said aluminum-containing material with said auxiliary metal at a point to prevent substantial penetration of the consequently forming alloy mixture into the material of said semiconductor body.

11. A method of producing semiconductor devices having a semi-conductor body and at least one aluminum-containing electrode alloyed thereto in conjunction with an auxiliary metal adapted to wet the conductor body, comprising placing upon the semiconductor body to be processed a guide which is made of a material remaining unaffected by the alloying metals in a wetting sense and having a channel formed therein the cross sectional dimensions of which determine the extent of the alloying area on said semiconductor, introducing into said guide channel a pill of said auxiliary metal which drops therethrough to said area on said semiconductor body, applying heat to melt said pill so as to alloy the material thereof to said semiconductor body, thereupon introducing into said guide channel an aluminum-containing material which drops therethrough into contact with said auxiliary metal alloyed to said semiconductor body, interalloying said aluminum containing material to said auxiliary metal on said semiconductor body, thereafter alloying both said auxiliary metal interalloyed with said aluminum-containing material into said semiconductor body to a desired depth, removing said guide upon conclusion of said alloying, and agitating said metals during the alloying thereof.

References Cited in the file of this patent

UNITED STATES PATENTS

| | | |
|---|---|---|
| 2,023,498 | Winston | Dec. 10, 1935 |
| 2,835,615 | Leinfelder et al. | May 20, 1958 |
| 2,861,018 | Fuller et al. | Nov. 18, 1958 |
| 2,862,840 | Kordalewski | Dec. 2, 1958 |